US008566525B2

(12) United States Patent
Ash et al.

(10) Patent No.: US 8,566,525 B2
(45) Date of Patent: *Oct. 22, 2013

(54) TECHNIQUES FOR MANAGING DATA IN A STORAGE CONTROLLER

(75) Inventors: Kevin J. Ash, Tucson, AZ (US);
Richard A. Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/399,579

(22) Filed: Feb. 17, 2012

(65) Prior Publication Data

US 2012/0151143 A1 Jun. 14, 2012

Related U.S. Application Data

(63) Continuation of application No. 12/504,222, filed on Jul. 16, 2009, now Pat. No. 8,140,763.

(51) Int. Cl.
*G06F 12/04* (2006.01)

(52) U.S. Cl.
USPC ............. 711/129; 710/28; 711/103; 711/118; 711/154; 711/163

(58) Field of Classification Search
USPC ............. 711/129, 103, 118, 154, 163; 710/28
See application file for complete search history.

(56) References Cited

U.S. PATENT DOCUMENTS

| 5,491,807 | A | * | 2/1996 | Freeman et al. | 711/1 |
| 5,604,699 | A | | 2/1997 | Cappelletti et al. | |
| 5,689,509 | A | * | 11/1997 | Gaytan et al. | 370/396 |
| 5,862,314 | A | | 1/1999 | Jeddeloh | |
| 2002/0027814 | A1 | | 3/2002 | Kojima et al. | |
| 2002/0108072 | A1 | * | 8/2002 | Beng Sim et al. | 714/5 |
| 2005/0102465 | A1 | * | 5/2005 | Royer | 711/1 |
| 2006/0156130 | A1 | | 7/2006 | Huott et al. | |
| 2009/0055680 | A1 | | 2/2009 | Honda et al. | |

OTHER PUBLICATIONS

Kevin J. Ash et al., U.S. Appl. No. 12/504,222, Notice of Allowance dated Nov. 21, 2011.

* cited by examiner

*Primary Examiner* — Jae Yu
(74) *Attorney, Agent, or Firm* — Yudell Isidore Ng Russell PLLC

(57) ABSTRACT

A technique for limiting an amount of write data stored in a cache memory includes determining a usable region of a non-volatile storage (NVS), determining an amount of write data in a current write request for the cache memory, and determining a failure boundary associated with the current write request. A count of the write data associated with the failure boundary is maintained. The current write request for the cache memory is rejected when a sum of the count of the write data associated with the failure boundary and the write data in the current write request exceeds a determined percentage of the usable region of the NVS.

18 Claims, 6 Drawing Sheets

Rank j Failure Event

Delete Failed Rank j Event

Repair Failed Rank j Event

TECHNIQUES FOR MANAGING DATA IN A STORAGE CONTROLLER This application is a continuation of U.S. patent application Ser. No. 12/504,222 (now U.S. Pat. No. 8,140,763), entitled "TECHNIQUES FOR MANAGING DATA IN A WRITE CACHE OF A STORAGE CONTROLLER," to Kevin J. Ash et al., filed Jul. 16, 2009, the disclosure of which is hereby incorporated by reference in its entirety for all purposes.

BACKGROUND

1. Field

The present disclosure is generally directed to a storage controller and, more particularly, to techniques for managing data in a write cache of a storage controller.

2. Related Art

A data storage system is commonly utilized to store information provided by a computer system. Upon receipt of a write request, a disk drive controller within a data storage system initially stores incoming write data in a write cache within a volatile memory device. The write data in the write cache is subsequently destaged when the write data is written to a designated storage target device, such as a hard disk drive. In certain implementations, a copy of the write data is also stored in a non-volatile storage unit until the write data is destaged in order to enhance protection against data loss. The non-volatile storage unit often has less storage capacity than the write cache, which may simultaneously store incoming write data and outgoing read data.

An unexpected failure of a designated storage target device can prevent write data in a write cache from being destaged, which in turn causes incoming write data to be pinned in the write cache (as well as a non-volatile storage unit). In fact, even the failure of a small number of designated storage target devices may cause the sudden pinning of a large amount of write data in a write cache. When storage space in a non-volatile storage unit is completely consumed by pinned write data, additional write requests cannot be processed by a data storage system within an acceptable time frame.

SUMMARY

According to an embodiment of the present disclosure, a technique for limiting an amount of write data stored in a cache memory includes determining a usable region of a non-volatile storage (NVS), determining an amount of write data in a current write request for the cache memory, and determining a failure boundary associated with the current write request. A count of the write data associated with the failure boundary is maintained. The current write request for the cache memory is rejected when a sum of the count of the write data associated with the failure boundary and the write data in the current write request exceeds a determined percentage of the usable region of the NVS.

All features and advantages of the present invention will become apparent in the following detailed written description.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION OF A PREFERRED EMBODIMENT

Figure 1:
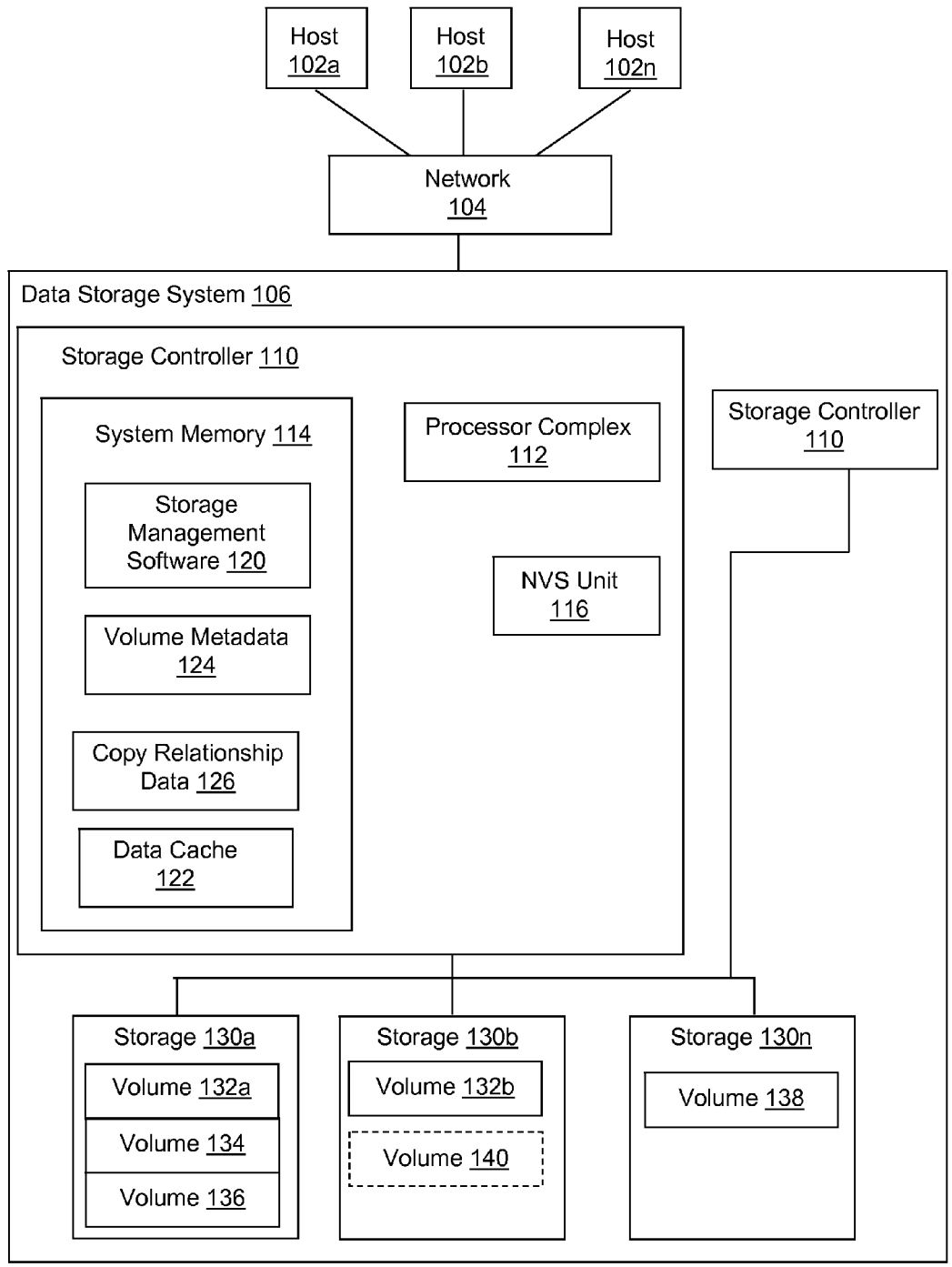
FIG. 1 is a block diagram of a computing environment in which an embodiment of the present invention may be incorporated.

As will be appreciated by one of ordinary skill in the art, the present invention may be embodied as a method, system, or computer program product. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, the present invention may take the form of a computer program product on a computer-usable storage medium having computer-usable program code embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable medium storage includes: a portable computer diskette, a hard disk, a random access memory (RAM), a read-only memory (ROM), an erasable programmable read-only memory (EPROM) or Flash memory, a portable compact disc read-only memory (CD-ROM), an optical storage device, or a magnetic storage device. Note that the computer-usable or computer-readable storage medium could be used in the invention for storing a program or for storing data or metadata that is used by the program to accomplish its intended function. It should also be noted that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this disclosure, a computer-usable or computer-readable storage medium may be any medium that can store a program for use by or in connection with an instruction execution system, apparatus, or device.

Computer program code for carrying out operations of the present invention may be written in an object oriented programming language, such as Java, Smalltalk, C++, etc. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus implement the functions/acts specified in the flowchart and/or block diagram block or blocks. As used herein, the term "coupled" includes both a direct electrical connection between blocks or components and an indirect electrical connection between blocks or components achieved using one or more intervening blocks or components.

According to the present disclosure, techniques for managing data in a write cache of a data storage system are disclosed that limit write data that is pinned in the write cache (due to any potential storage device failure(s)) such that the adverse affect (due to insufficient write cache space) of failing storage devices on ongoing write operations is minimized. In general, there is a trade-off between selecting a low limit which provides for more survivability to multiple failures and selecting a high limit that does not arbitrarily limit the performance of a given element when a workload is skewed toward the given element.

With reference to FIG. 1, a block diagram of a computer environment is illustrated in which an embodiment of the present invention may be incorporated. As shown, host computers 102a-102n are coupled to a data storage system 106 via a network 104. The data storage system 106 receives write and read requests from host computers 102a-102n. As is illustrated, data storage system 106 includes multiple storage controllers 110 (for redundancy) that are each coupled to multiple storage devices 130a-130n. The storage devices 130a-130n may be, for example, direct access storage devices, such as hard disk drives. Each of the storage controllers 110 includes a processor complex 112, a system memory 114, and a non-volatile storage (NVS) unit (also referred to herein as "non-volatile storage") 116. The storage controllers 110 are configured to manage the storage devices 130a-130n and facilitate the processing of write and read requests intended for the storage devices 130a-130n.

The system memory 114 stores program instructions and data that the processor complex 112 may access for executing functions associated with managing the storage devices 130a-130n. The system memory 114 also includes a data cache 122 for buffering write data and read data. It should be appreciated that the data cache 122 can be allocated in a device external to the system memory 114, as long as the data cache 122 can be accessed by the processor complex 112.

The NVS unit 116 provides additional security against data loss. The NVS unit 116 may be implemented with a non-volatile memory device that may or may not utilize external power to retain data stored therein. In some implementations, a backup power source (not shown), such a battery, is utilized to supply the NVS unit 116 with sufficient power to retain the data stored therein in case the data storage system 106 loses AC power. In other implementations, the NVS data may be stored in volatile memory (not shown), which might be in a separate unit or may be part of the system memory 114. In this case, a backup power source (not shown), such as a battery, is utilized to supply the processor complex 112 and the volatile memory with power to allow the transfer of the NVS data in the volatile memory to a non-volatile storage device, such as a system disk on the processor complex (not shown), in the event the data storage system 106 loses AC power.

The storage units 130a-130n may be, for example, a just a bunch of disks (JBOD) array or a redundant array of independent disks (RAID) array. A collection of physical storage arrays can be further combined to form a rank, which disassociates the physical storage from the logical configuration. The storage space in a rank may be allocated into logical volumes that are accessible to the host for read/write operations, which specify a storage location on a logical volume.

As shown in FIG. 1, a logical volume (or simply volume) may have different kinds of allocations. The storage units 130a-130n are shown as ranks in the data storage system 106, and are referred to herein as rank 130a, 130b and 130n. A rank may be configured to include one or more partial and/or entire volumes. For example, the rank 130a is shown to have two entire volumes 134 and 136, as well as one partial volume 132a. The rank 130b is shown to have one entire volume 140 and one partial volume 132b. Thus, volume 132 is allocated across ranks 130a and 130b. The rank 130n is shown to have one entire volume 138. Ranks and volumes may further be divided into tracks, which represent a fixed block of storage. A track is therefore associated with a given rank and volume.

Further, the volumes 132, 134, 136 and 138 are shown as 'standard logical volumes'. In a standard logical volume (standard volume), the storage capacity is physically allocated on a rank at the time the volume is configured. The rank, or portion thereof, on which a standard volume has been allocated, is referred to herein as a 'real rank', and a real rank is comprised of 'real tracks'. A standard volume has metadata that is used to manage the logical volume that is allocated space on real ranks along with the space allocated to store the host data stored on the logical volume.

A 'space-efficient' logical volume (space-efficient volume) is a volume for which storage is not physically allocated prior to the time that write data intended for the space-efficient volume is accepted into the write cache. The granularity of space allocated to a space-efficient volume to store data may be a real track. A space-efficient volume requires real storage to store the following information: (1) data that is written to the logical volume by the host; (2) metadata that is used to map a track of the logical volume that was written by the host to a location of a real track on a real rank that is used to store the associated data; and (3) metadata that is used to manage the logical volume. Space to store such information can be configured on a real rank in an 'auxiliary volume' as shown by the dashed lines for volume 140 on rank 130b.

An auxiliary volume is like a standard volume in that it is allocated real tracks on real ranks. Unlike a standard volume, an auxiliary volume is not host accessible and is only used internally by a storage controller. The storage for information (1) and (2) may be allocated on an auxiliary volume that is referred to as a 'repository'. The storage for information (3) may be allocated on an auxiliary volume that is referred to as a 'virtual rank'. A virtual rank is like a real rank in that the space for metadata on the virtual rank is allocated to a space-efficient volume in the same way the space for metadata and host data on a real rank is allocated to a standard volume. It should be noted that tracks associated with a space-efficient volume are associated with a virtual rank in the same way that the tracks on a standard volume are associated with a real rank.

On a standard volume, the relationship of a logical track to a real track on a real rank can be determined at the time write data is written into the write cache. On a space-efficient volume, when a write occurs, the logical track on the logical volume must be mapped to a real track in the repository. Once mapped, this relationship is stored in the repository metadata by the storage controller. The allocated real track in the repository auxiliary volume has an associated real track on a real rank, such that the track on the space-efficient volume is ultimately associated with a real track on a real rank through the mapping process. The relationship between the space-efficient volume's track and a real rank may be resolved at the point the write data is accepted into the write cache or it may be resolved later when the data is being destaged. Since it is potentially advantageous to performance to defer the resolution to destage time, some embodiments of write cache limiting may assume that this is the case.

One form of advanced functionality that may be implemented on a storage controller is an 'outboard copy function'. An outboard copy function provides the host a way to request that data from one logical volume be copied to another logical volume. In one embodiment, the copy function provides a point in time copy such that all source data on the source logical volume at the time the request is made is copied to the target data on the target logical volume. In some implementations, the source and target logical volumes may be accessible for host read/write operations while the point in time copy is in progress and the storage controller behaves such that, from the host perspective, any data read from the target volume appears as though the copy is already complete. In one implementation, the behavior is accomplished by: (1) a background process that attempts to copy all uncopied source data to the target data; (2) a foreground process that detects writes to the source data that have not been copied and causes the data to be copied from the source volume to the target volume before the original data is overwritten by the new write; and (3) a foreground process that detects reads to target data that have not been copied yet and obtains the requested data from the source data. The source and/or target logical volumes of a copy function may be either standard volumes or space-efficient volumes.

The total consumption of storage capacity in the NVS unit 116 prohibits incoming write data from being accepted, thereby causing all write operations on data storage system 106 to cease. One potential cause of such a detrimental event is the failure of a storage array on which currently cached write data is intended to be written. For example, it may be possible for one of hosts 102a-102n to fill the NVS unit 116 with write data before storage management software 120 has detected that a storage array in a given real rank is inaccessible, causing any write data targeted to that real rank to become pinned. In general, it is desirable that the failure of a single array not cause the data storage system 106 to become totally inoperable. As is discussed subsequently, techniques disclosed herein limit the amount of data in the NVS unit 116, such that a failure of a single array does not result in pinned data occupying the entire NVS unit 116.

In one prior art solution, write data written to standard volumes and targeting a given real rank are limited to occupying no more than a given fraction, for example 25%, of the total storage capacity of an NVS. This solution may provide protection in many operational scenarios. However, this constraint can only be implemented in cases where the write data can be associated with a real rank at the time the write is accepted into a data cache. Specifically, this constraint can be used for writes to any track on a standard volume, in the absence of a copy relationship. This is because the real rank is known at write time and there is nothing that would prevent the destaging of the write data to the rank, other than the failure of the real rank. Thus, if all write data in an NVS are to standard volumes that are not in a copy relationship, the failure of any one real rank could cause at most the given fraction, for example 25%, of the NVS to become pinned. The standard volumes associated with the failing rank would become inaccessible, but all other standard volumes would continue to be accessible. In this case, a data storage system could in fact survive at least three independent real rank failures, since the combination of failures would cause at most 75% of the NVS to become pinned.

When a write request is issued to a track of a volume that is the source track of a copy relationship, the track may be known to be a source track at write time, but the need to copy the source track to the target track may not be determined until destage time for performance reasons. The source track may have multiple copy relationships, such that there are multiple target tracks, each of which may reside on a different real rank and each of which may or may not need to have data copied from the source track. However, even though every real rank that is possibly impacted by this incoming write request may be determined, it may not be desirable for performance reasons to determine this at write time. The techniques described below do not depend on knowledge of the target ranks at write acceptance time to limit NVS data so that a rank failure does not pin the entire NVS when there are writes to a source track involved in a copy relationship.

When a write request is issued to a space-efficient volume, the write may be accepted into the cache before the storage controller determines whether the track being written is already allocated or is yet to be allocated in the repository. Since this determination may include a lengthy search operation, directly accepting the write request from the host into the cache may provide a performance advantage. At destage time, the storage controller determines whether the track is allocated. If the track is not allocated, the storage controller allocates an available track in the repository volume to the space-efficient volume.

However, if the repository volume is unable to allocate the track at destage time, the write request becomes pinned in the NVS. This situation may arise because the track in question has been allocated to a real rank that includes a failed device or the repository has run out of physical capacity. In general, the techniques described below limit NVS data so that a rank failure does not pin the entire NVS during a write to a space-efficient volume.

When a write request is issued to a track of a volume that is the source track of a copy relationship and one or more target tracks are on one or more space-efficient volumes, all of the considerations described above for a copy relationship and additionally the considerations for the space-efficient target volumes may apply in combination.

The amount of write data in an NVS changes dynamically as data is accepted into the NVS and data is destaged and deleted from the NVS. In particular, the counting of write data in the NVS may be updated on a per write (when data is added to the NVS) and per destage (when data is deleted from the NVS) operation basis. The values for the amount of write data in the NVS being monitored in the various limits may change dynamically with each write and each destage. Additionally, the values for the amount of pinned data may change dynamically with additional failures or repairs.

The limits described herein to write requests are applicable on a per write operation such that if the limit would be exceeded by a given write request, the write is rejected. Further, the amount of pinned data may change dynamically when a failure occurs, when a repair is effected, when pinned data is destaged (recovered), or when pinned data is deleted (lost). In one embodiment, write data is counted by counting the number of modified sectors within the track being modified (a track is composed of a number of sectors, each independently accessible by the host).

A given failure of a storage device may result in a certain amount of pinned write data in the NVS. Survivability, i.e., continued operation, of a data storage system after a failure may be enhanced if limits applied on incoming write requests in any given case are determined based on the remaining available space in the NVS, rather than the total NVS space. For example, write data associated with each real rank may be limited to 25% of the NVS space that is not pinned.

In one embodiment, the write data associated with each real rank is limited to 25% of the NVS size after subtracting out any pinned data. Thus, initially, each real rank would be limited to using at most 25% of the NVS. After the first failure which might pin J % of the NVS (for example, J<25%), each real rank would be limited to 25%*(100−J) of the NVS. After a second rank failure caused K % of the NVS to become pinned (K<25%*(100−J)), each real rank would be limited to 25%*(100−J−K). The allowed NVS limit may thus be dynamically reduced as more of the NVS space becomes pinned, allowing for continued operation despite multiple single storage device failures.

For the case of host write requests to a standard volume, a technique is applied wherein the amount of data stored in the NVS associated with given rank is limited to K1% of the NVS space. In one embodiment, K1% is determined based on the number of configured ranks. In one embodiment K1 is 25%. In one embodiment, K1 is 100% if one rank is configured, 50% is two ranks are configured, 33% if three ranks are configured, and 25% if four or more ranks are configured. Furthermore, the amount of write data in an NVS for a set of ranks associated with a failure boundary of a back-end storage is also limited to K2% of the NVS space. The back-end partition is associated with an interconnection fabric between a subset of storage devices and a subset of device adapters in a storage controller. In a given failure at this boundary, the loss of access between the subset of storage devices and their associated subset of device adapters may occur. In one embodiment, the subset of adapters is a pair of redundant device adapters, the subset of storage devices is the set of storage devices attached to the pair of device adapters over a fibre channel arbitrated loop (FC-AL) interconnection fabric comprising the corresponding cabling and switches. In one embodiment, the K2 value is 80%.

For the case of host write requests to a space-efficient volume, the amount of write data stored in the NVS designated for a given rank is limited to a percentage of the NVS space. The write requests to space-efficient volumes cannot be designated at write time to a single real rank, but only to the set of ranks within a single extent pool. An extent pool is a set of ranks that a logical volume is limited to allocate space on. In the case of a space efficient volume, the auxiliary volumes used to store data for a space efficient volume are also limited to be provisioned in the same extent pool as the space efficient logical volume. As such, a write to a space efficient volume can at least be known to be limited to the set of real ranks configured in its associated extent pool. The write requests to the space-efficient volumes in a storage pool are associated with the virtual rank(s) associated with the same storage pool.

In one embodiment, the amount of write data allowed to be in the NVS for the set of virtual ranks in a single extent pool is limited to, for example, 25%. Considering the failure of a single real rank which has both associated standard volumes and space-efficient volumes (i.e., the repository or virtual rank has storage allocated on this real rank), the set of standard volumes can result, in the present example, in pinning up to 25% of the NVS as previously described and the set of space-efficient volumes can result in pinning up to an additional 25%. In this example, a single rank failure may not cause more than 50% of the NVS to become pinned. Similarly, if the first rank failure results in N % of the NVS being pinned due to real ranks and M % of the NVS being pinned due to virtual ranks, then subsequently, virtual ranks would be limited to 25%*(100−N−M).

For the case of write requests to source tracks of a volume involved in a copy relationship, the following worst case assumptions may be made: a first assumption assumes the rank that fails is the rank that has all target tracks for source tracks in the NVS; a second assumption assumes the rank that fails is the rank that has the most amount of NVS data associated with any single real rank; and a third assumption assumes the rank that fails is a rank that has an associated repository or virtual rank that has the most amount of NVS data that is associated with the set of virtual ranks in any single extent pool.

In view of the above assumptions, it is noted that since any source tracks in the second and third assumptions have already been counted in the first assumption, the counts in the second and third assumptions may be limited to just the non-source tracks. To accomplish the desired limiting, the amount of write data in an NVS that is associated with any source tracks (X(i)) and the amount of write data in the NVS that is associated with any non-source tracks (Y(i)) for each rank (R(i)), (for both real and virtual ranks) may be maintained. Since the aforementioned algorithms already cause the total amount of write data (Z(i)) for each rank (R(i)) to be maintained, the X(i) may be singularly maintained, since the Y(i) can be determined as Y(i)=Z(i)−X(i).

In one implementation, the total amount of source tracks in the NVS for the first assumption is equal to the sum of all the X(i) for all non-failed ranks, given by A. The maximum amount of non-source track data on any one real rank in the second assumption is determined as the largest Y(i) associated with any single non-failed real rank, given by B. The maximum amount of non-source track data on any one extent pool in the third assumption is the largest sum for a set of Y(i)s of the non-failed virtual ranks in any one extent pool, given by C. By limiting the sum (A+B+C) to be N % of the NVS, a single real rank failure will not consume more than N % of the NVS. In general, 'N' needs to be a relatively large percentage of the NVS, for example 85%, because there are workloads where all write data in the NVS is directed to source tracks. In the worst case event of a single rank failure, 85% of the NVS becomes pinned, but operation can continue on any volumes that are not associated with the failing rank. However, write requests to source tracks may be rejected.

Generally, the worst case assumptions do not apply so that the amount of data pinned is less than N % and write requests to source tracks may be allowed. As with the previously described approaches, if the first failure results in pinning J % of the NVS, the new limit for this case is calculated as N %*(100−J).

Figure 2:
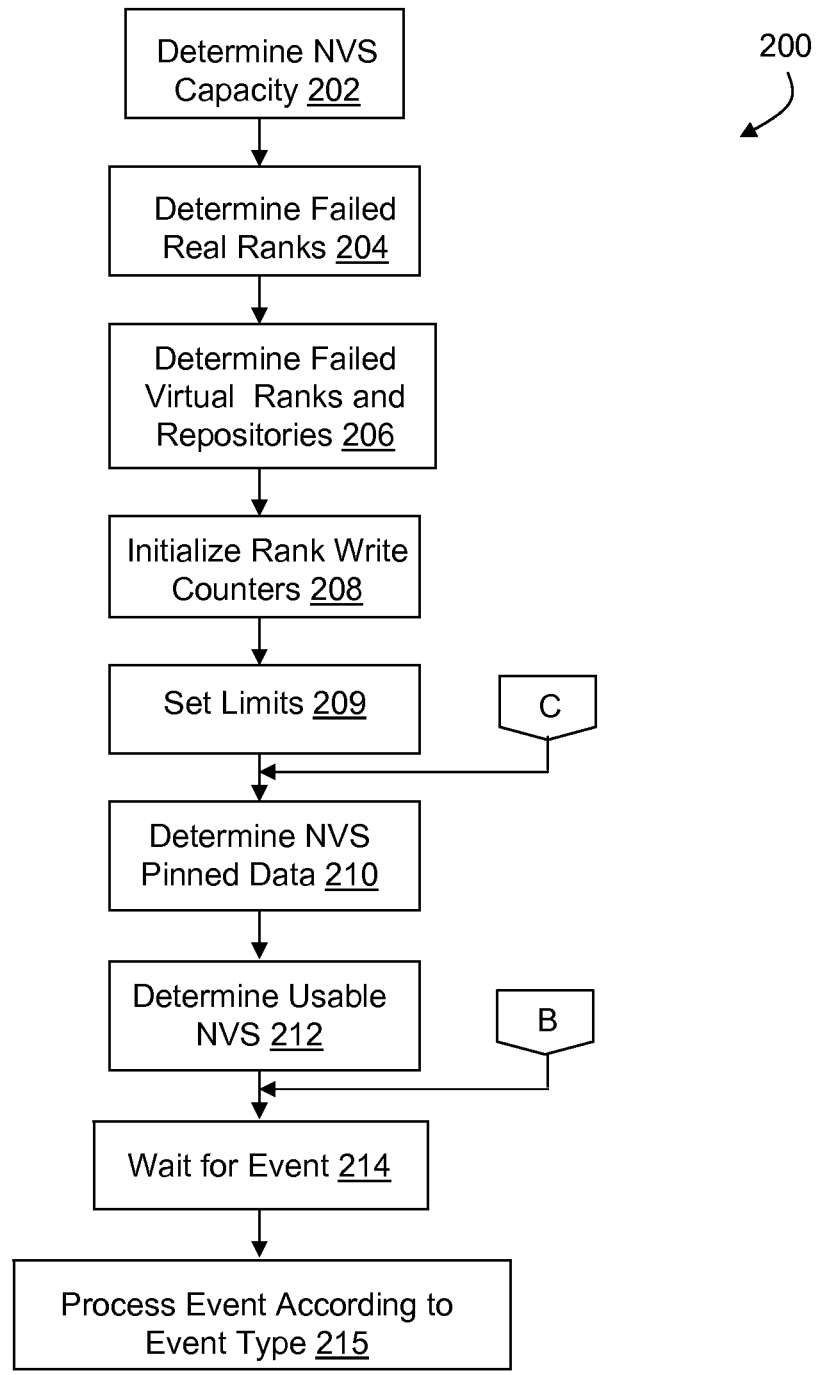
FIGS. 2-8 are flowcharts illustrating various techniques for managing data in a write cache of a data storage system.

With reference to FIG. 2, a process 200 determines an initial state of data in an NVS and sets up various counters (used to maintain the amounts of write data in the NVS) and constants (used to detect thresholds for NVS limits). More specifically, in block 202 a storage controller determines an NVS capacity. Next in block 204, the storage controller determines failed real ranks. Then, in block 206, the storage controller determines failed virtual ranks and repositories. Next, in block 208, the storage controller initializes rank write counters (i.e., $Z(i)=0$ and $X(i)=0$, where $Z(i)$ is the write data in the NVS for the rank 'i' and $X(i)$ is the source write data in the NVS for the rank 'i').

Various limits are then set in block 209. For example a single rank limit (K1) may be set to 25%, a real rank failure boundary limit (K2) may be set to 80%; a extent pool virtual write limit (K3) may be set to 25%, and a copy source write limit (K4) may be set to 85%. In block 210, the amount of NVS pinned data is determined. Next, in block 212, a useable amount of NVS space is determined by subtracting the NVS pinned data from the NVS total data size. The storage controller then waits for an event in block 214 that triggers the processing of the event in block 215. For example the event may correspond to a write request event (see FIGS. 3 and 4), a destage event (see FIG. 5), a rank T failure event (see FIG. 6), a delete failed rank T event (see FIG. 7), or a repair failed rank T event (see FIG. 8).

Figure 3:
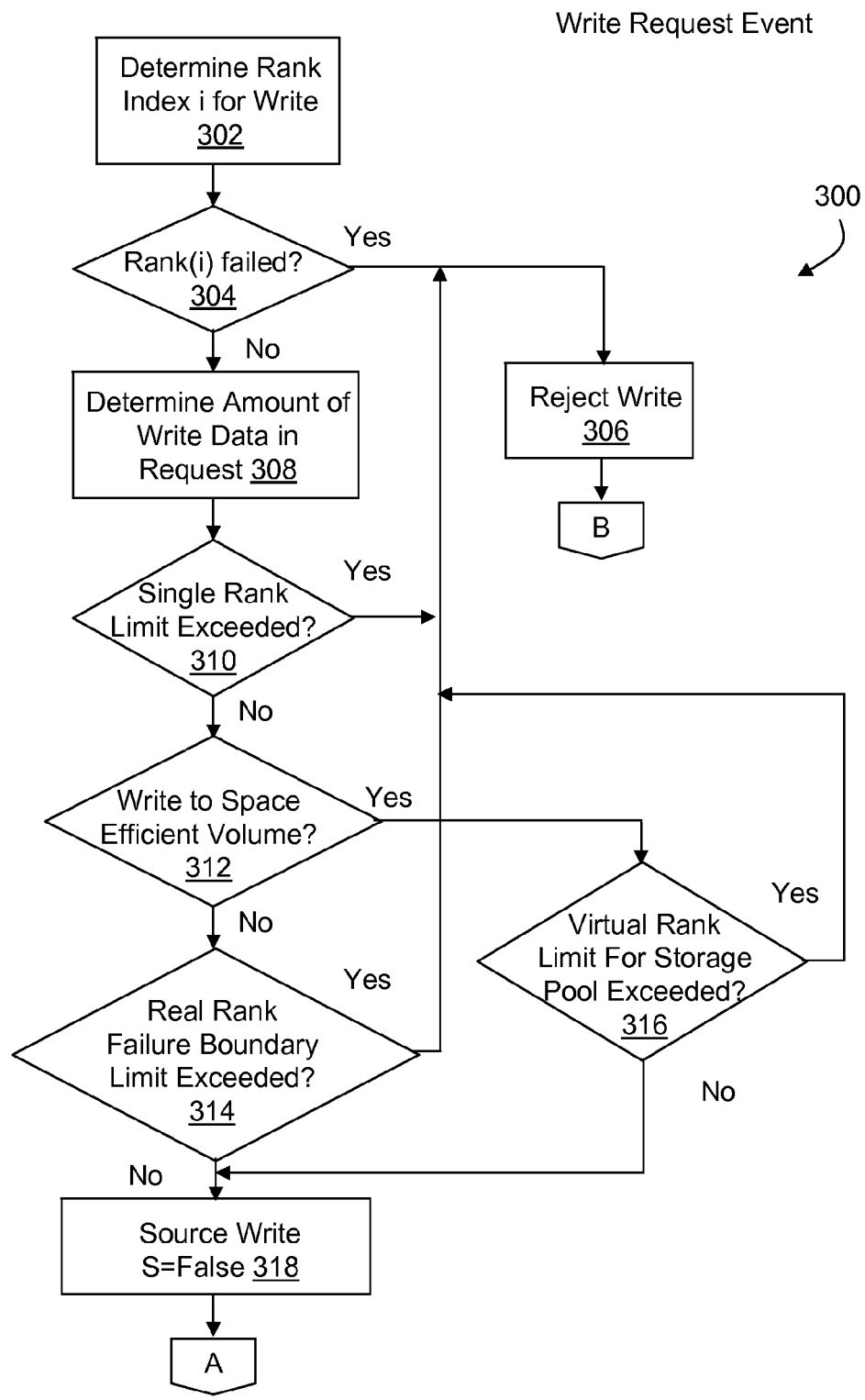
Figure 4:
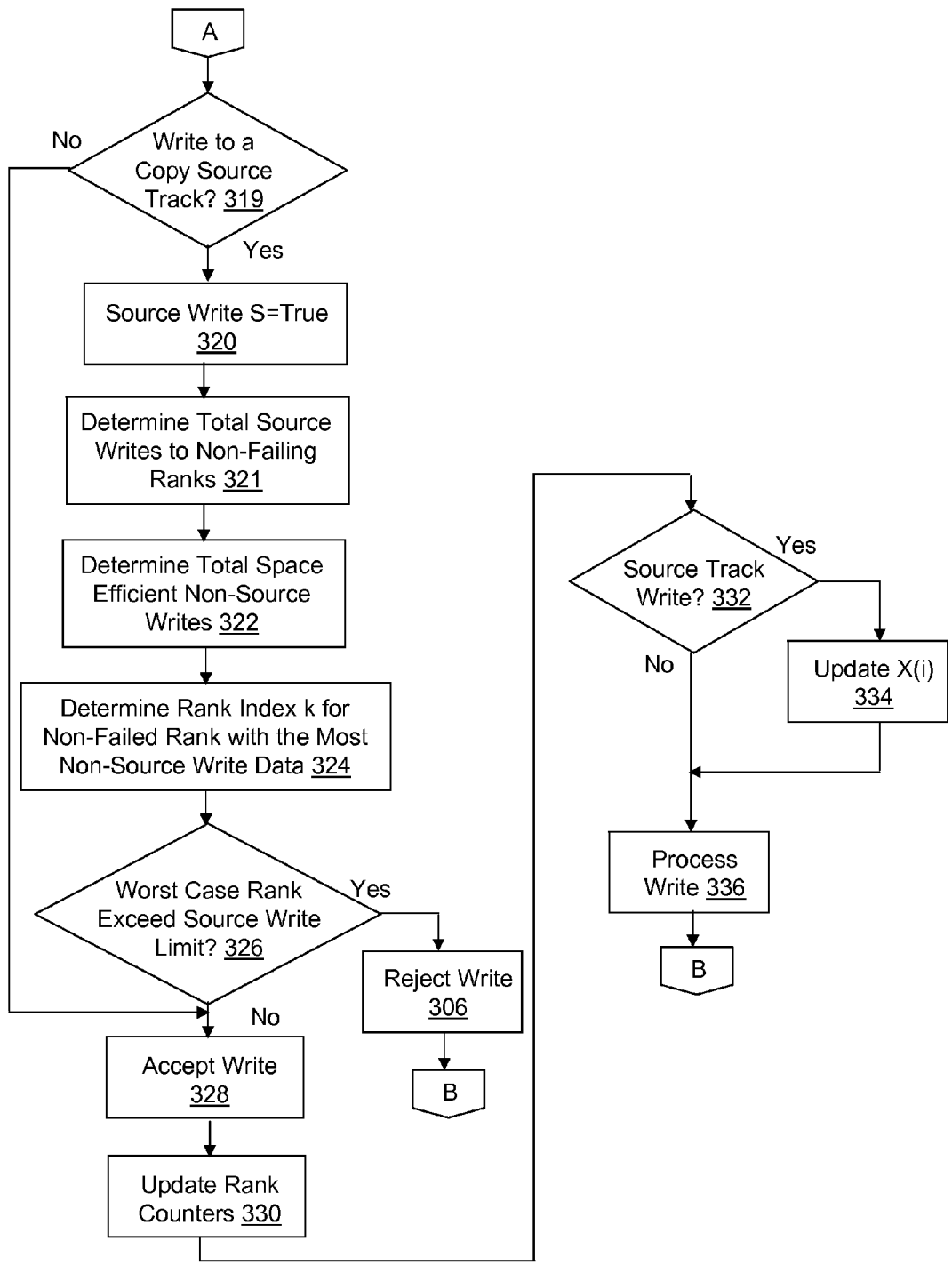

With reference to FIGS. 3 and 4, a process 300 provides an example flow for a write request event. In block 302 the storage controller determines an index 'i' associated with a real or virtual rank that a write request is associated with. Next, in decision block 304, the storage controller determines whether the rank 'i' has failed. If the rank 'i' failed, control transfers from block 304 to block 306 where the storage controller rejects the write request. If the rank 'i' did not fail in block 306, control transfers to block 308 where the storage controller determines the amount of write data in the write request. Next, in decision block 310, the storage controller determines if a single rank limit is exceeded (i.e., if $Z(i)+D/$ usable NVS>K1). When the write request would cause the single rank limit threshold to be exceeded in block 310, control transfers to block 306 where the write request is rejected (thus, preventing a single rank from using an excessive amount of storage in the NVS). When the write request would not cause the single rank limit threshold to be exceeded in block 310, control transfers to decision block 312 where the storage controller determines if the write request is directed to a space-efficient volume.

If the write request is directed to a standard volume in block 312, control transfers to decision block 314 where the storage controller determines if the write request would cause a real rank failure boundary limit to be exceeded (i.e., if ((D+Sum Z(i) for non-failed real ranks in a same back-end storage failure boundary as rank(i))/usable NVS)>K2). If the write request would cause the real rank failure boundary limit to be exceeded, control transfers from block 314 to block 306, where the storage controller rejects the write request. If the write request would not cause the virtual rank limit for a storage pool to be exceeded, control transfers from block 314 to block 318. In block 318, the storage controller sets a source write flag 'S' to false. If the write request is for a space-efficient volume in block 312, control transfers from block 312 to decision block 316. In block 316, the storage controller checks the write request to determine if the write request would cause the virtual rank limit for a storage pool to be exceeded (i.e., if ((Sum Z(i) for non-failed virtual ranks in same storage pool as rank(i)+D)/usable NVS)>K3).

If the write request would cause the virtual rank failure boundary limit to be exceeded, control transfers from block 316 to block 306 where the write request is rejected. If the write request would not cause the virtual rank limit for a storage pool to be exceeded, control transfers from block 316 to block 318. Following block 318, the storage controller determines if the write request is a copy source track in decision block 319. If the write request does not correspond to a write to a copy source track, control transfers from block 319 to block 328 where the controller accepts the write. If the write request corresponds to a write to a copy source track, control transfers from block 319 to block 320, where the storage controller sets the source write flag 'S' to true and proceeds to block 321.

Blocks 321, 322, and 324 determine the values that are needed to check and reject the write request in decision block 326 if a worst case rank exceeds a source write limit. Specifically, the storage controller determines: the total source writes to non-failing ranks in block 321 (T=Sum X(k)); the maximum space-efficient non-source writes for any one extent pool in block 322 (V=Max(Sum (Z(i)-X(i) for all non-failed virtual ranks in extent pool 1), Sum(Z(i)-X(i) for all virtual ranks in extent pool 2), etc.)); and the maximum amount of non-source write data on any one real rank (U=Max (Z(1)-X(1), Z(2)-X(2), etc.) in block 324. If a worst case rank exceeds a source write limit in decision block 326 (i.e. (Sum(D+T+U+V)/Useable NVS)>K4), control transfers to block 306 where the write request is rejected. If a worst case rank does not exceed a source write limit in block 326, control transfers to block 328 where the write request is accepted.

Next, in block 330, the storage controller updates the rank counters for the rank that the write is directed to (i.e., $Z(i)=Z(i)+D$). Next, in decision block 332, the storage controller determines if the write request corresponds to a source track write. If the write request corresponds to a source track write, control transfers to block 334, where the storage controller updates the source write data in the NVS for the rank 'i' (i.e., $X(i)=X(i)-D$). Next, in block 336, the storage controller processes the write request, saving information for a subsequent destage operation. If the write request does not correspond to a source track write, control transfers directly from block 332 to block 336 without updating the source write data in the NVS for the rank. Following block 336, control transfers to block 214 (see FIG. 2), where the storage controller waits for a next event to occur.

Figure 5:
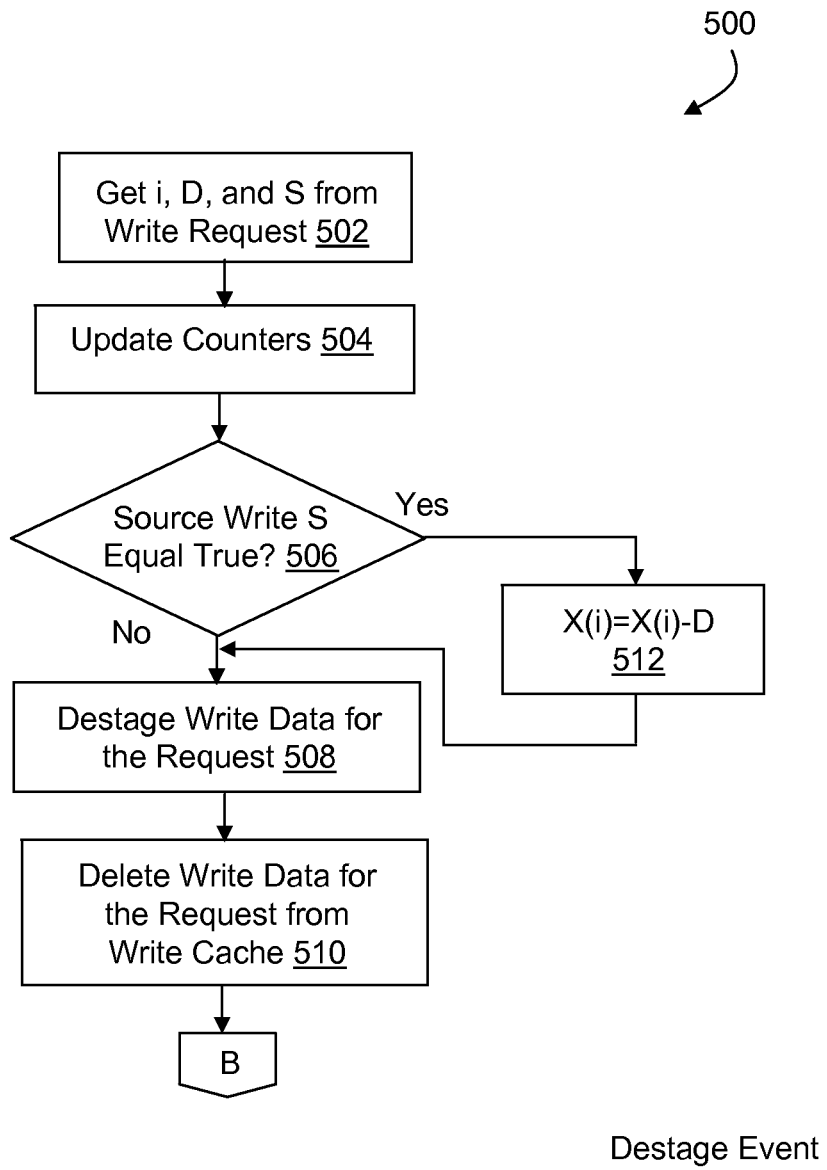

With reference to FIG. 5, a process 500 is initiated when an event corresponds to a destage event. In block 502, the storage controller retrieves information (i, D, S) from the write request to determine the rank associated with the write 'i', the amount of data in the write 'D', and whether the write was to a source track (i.e., whether 'S' is true or false). Next, in block 504, the storage controller updates the write data counters for the rank (i.e., $Z(i)=Z(i)-D$). Then, in decision block 506, when the write was to a source track, control transfers to block 512, where the storage controller updates the source write data in the NVS for the rank (i.e., $X(i)=X(i)-D$). Control then transfers from block 512 to block 508. In decision block 506, when the write was not to a source track, control transfers to block 508, where the storage controller destages the write data for the write request to disk. Next in block 510, the storage controller deletes the write data for the write request from the non-volatile storage and the data in the write cache is indicated as not modified (i.e., the data in the write cache is now stored on disk). Control then transfers from block 510 to block 214 (see FIG. 2), where the storage controller waits for the next event to occur.

Figure 6:

With reference to FIG. 6, when a rank failure event occurs (see FIG. 2, blocks 214 and 215), the storage controller pins all write data associated with the failing rank in the NVS in block 602. The data is held pinned pending a determination of whether the rank can be repaired or whether the rank is to be deleted. Control then transfers from block 602 to block 210 where the storage controller recalculates the amount of pinned data in the NVS and then transfers control to block 212 and then block 214, where the storage controller waits for the next event to occur.

Figure 7:
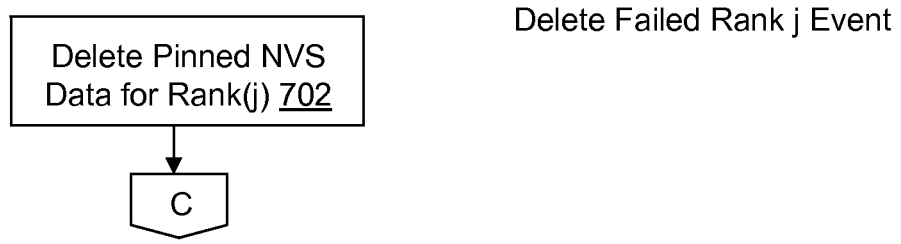

With reference to FIG. 7, block 702, when an event indicates a rank is to be deleted after a rank failure (see FIG. 2, blocks 214 and 215), the storage controller deletes all pinned write data associated with the rank in the NVS. Control then transfers from block 702 to block 210 where the storage controller recalculates the amount of pinned data in the NVS and then transfers control to block 212 and then block 214, where the storage controller waits for the next event to occur.

Figure 8:
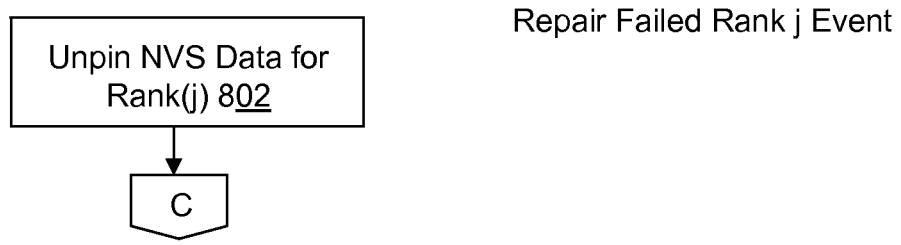

With reference to FIG. 8, block 802, when an event indicates a rank is to be repaired after a rank failure (see FIG. 2, blocks 214 and 215), the storage controller unpins all pinned write data associated with the rank in the NVS. Control then transfers from block 802 to block 210 where the storage controller recalculates the amount of pinned data in the NVS and then transfers control to block 212 and then block 214, where the storage controller waits for the next event to occur.

Advantageously, the techniques disclosed herein efficiently manage data in a write cache of a storage controller.

While an illustrative embodiment of the present invention has been described in the context of a fully functional data storage system, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as solid-state thumb drives, floppy disks, hard disk drives, CD ROMs, DVDs, Blu-Ray Disk, and ultra-density optical.

While the invention has been particularly shown and described with reference to a preferred embodiment, it will be understood by those skilled in the art that various changes in form and detail may be made therein without departing from the spirit and scope of the invention.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for limiting an amount of write data stored in a cache memory of a storage controller, the method comprising:
   determining a usable region of a non-volatile storage (NVS) of the storage controller;
   determining an amount of write data in a current write request for the cache memory;
   determining a failure boundary associated with the current write request; maintaining a count of write data associated with the failure boundary; and rejecting the current write request for the cache memory when a sum of the count of the write data associated with the failure boundary and the write data in the current write request exceeds a determined percentage of the usable region of the NVS, wherein loss of access to a given failure boundary causes write data associated with the given failure boundary to be held as pinned data until the given failure boundary can be repaired, allowing the pinned data to become unpinned, or until the given failure boundary is determined to have failed, allowing the pinned data to be deleted.

2. The method of claim 1, wherein the usable region of the NVS corresponds to a size of the NVS.

3. The method of claim 1, wherein the usable region of the NVS corresponds to a size of the NVS minus an amount of pinned write data.

4. The method of claim 1, wherein the failure boundary is for a single rank that includes one or more arrays each including one or more storage devices and the count for the failure boundary maintains the write data issued to all volumes that can map a write request directly to the single rank at the time the write request is issued.

5. The method of claim 1, wherein the failure boundary is for a set of ranks associated with a set of volumes and a single write request cannot be associated with a single rank but all writes to the set of volumes can be associated with the set of ranks such that the count for the failure boundary corresponds to a sum of all writes to the set of ranks in the failure boundary that are issued to the set of volumes.

6. The method of claim 5, wherein a failing rank is assumed to have associated write data for volumes than can map directly to a rank such that the count for the failure boundary also includes a largest count of direct mapped writes on any one rank.

7. The method of claim 6, wherein a largest count of direct mapped writes on any one rank includes both writes to source tracks and writes to non-source tracks, and wherein only a largest count of non-source direct mapped writes on any one rank in the failure boundary is considered.

8. The method of claim 4, wherein the single rank is limited to 25 percent of the NVS.

9. The method of claim 4, wherein the single rank is limited to 33 percent of the NVS.

10. The method of claim 4, wherein a limit for the failure boundary is 80 percent.

11. The method of claim 4, wherein the volumes are space-efficient volumes.

12. The method of claim 4, wherein a limit chosen for the failure boundary factors in that a failure of a rank can result in pinning of write data associated with volumes that can map to the single rank and can result in pining of write data associated with volumes that cannot map to the single rank.

13. The method of claim 4, wherein a failing rank is assumed to also be in a failure domain of a volume that cannot map directly to a rank such that the count for the failure boundary also includes a largest count of any one set of volumes that cannot map directly to a rank but can map to a set of ranks.

14. The method claim 13, wherein the largest count of any one set of volumes that cannot map directly to a rank but can map to a set of ranks includes both writes to source tracks and writes to non-source tracks, and wherein only a largest count of non-source writes to any one set of volumes that cannot map directly to a rank but can map to a set of ranks in the count for the failure boundary is considered.

15. The method of claim 1, wherein the failure boundary is for a single rank that is a target of a point in time copy relationship and a failure of the single rank results in pinning of write data on a source volume as existing data on the source volume cannot be copied to a target volume before destaging the write request.

16. The method of claim 15, wherein the count for the failure boundary is based on an assumption that all writes to all copy source volumes are targeted to a same failing rank.

17. A data storage system, comprising: non-volatile storage (NVS); a cache memory; and a storage controller coupled to the NVS and the cache memory, wherein the storage controller is configured to:

determine a usable region of the NVS; determine an amount of write data in a current write request for the cache memory; determine a failure boundary associated with the current write request; maintain a count of write data associated with the failure boundary; and reject the current write request for the cache memory when a sum of the count of the write data associated with the failure boundary and the write data in the current write request exceeds a determined percentage of the usable region of the NVS, wherein a failing rank is assumed to have associated write data for volumes than can map directly to a rank such that the count for the failure boundary also includes a largest count of direct mapped writes on any one rank.

18. A tangible computer readable storage device including code that, when executed, causes a storage controller of a data storage system to:

determine a usable region of a non-volatile storage (NVS) of the data storage system; determine an amount of write data in a current write request for a cache memory of the data storage system;

determine a failure boundary associated with the current write request; maintain a count of write data associated with the failure boundary; and reject the current write request for the cache memory when a sum of the count of the write data associated with the failure boundary and the write data in the current write request exceeds a determined percentage of the usable region of the NVS, wherein loss of access to a given failure boundary causes write data associated with the given failure boundary to be held as pinned data until the given failure boundary can be repaired, allowing the pinned data to become unpinned, or until the given failure boundary is determined to have failed, allowing the pinned data to be deleted.

* * * * *